(12) United States Patent
Bandyopadhyay

(10) Patent No.: US 8,832,266 B2
(45) Date of Patent: Sep. 9, 2014

(54) SYSTEM AND METHOD FOR AGGREGATING BANDWIDTH OF MULTIPLE ACTIVE PHYSICAL INTERFACES ON APPLICATION LAYER

(75) Inventor: Soma Bandyopadhyay, West Bengal (IN)

(73) Assignee: Tata Consultancy Services Limited (IN)

( * ) Notice: Subject to any disclaimer, the term of this patent is extended or adjusted under 35 U.S.C. 154(b) by 80 days.

(21) Appl. No.: 13/521,355

(22) PCT Filed: Feb. 25, 2011

(86) PCT No.: PCT/IN2011/000118
§ 371 (c)(1),
(2), (4) Date: Jul. 10, 2012

(87) PCT Pub. No.: WO2011/104729
PCT Pub. Date: Sep. 1, 2011

(65) Prior Publication Data
US 2013/0132562 A1    May 23, 2013

(30) Foreign Application Priority Data
Feb. 26, 2010  (IN) .......................... 517/MUM/2010

(51) Int. Cl.
*H04L 29/10* (2006.01)
*H04L 12/56* (2006.01)
*H04L 29/06* (2006.01)
*H04L 29/08* (2006.01)
*H04L 12/24* (2006.01)

(52) U.S. Cl.
CPC ............... *H04L 29/10* (2013.01); *H04L 47/41* (2013.01); *H04L 69/14* (2013.01); *H04L 67/327* (2013.01); *H04L 41/0896* (2013.01); *Y02B 60/33* (2013.01)
USPC ........................................................ 709/224

(58) Field of Classification Search
USPC ........................................................ 709/224
See application file for complete search history.

(56) References Cited

U.S. PATENT DOCUMENTS

| | | | |
|---|---|---|---|
| 6,879,590 B2 | 4/2005 | Pedersen et al. | |
| 6,973,504 B2 | 12/2005 | Nomura et al. | |
| 7,068,647 B2* | 6/2006 | Fangman et al. | 370/352 |

(Continued)

FOREIGN PATENT DOCUMENTS

WO        01/39002        5/2001

OTHER PUBLICATIONS

Magalhaes, L., et al., "Transport Level Mechanisms for Bandwidth Aggregation on Mobile Hosts;" Mobius, Sep. 2009 (Abstract only).

(Continued)

*Primary Examiner* — Tu Nguyen
(74) *Attorney, Agent, or Firm* — Ohlandt, Greeley, Ruggiero & Perle, L.L.P.

(57) ABSTRACT

The present invention provides a computationally efficient system and method for aggregation of bandwidth of multiple active physical Interfaces based on an application layer. The said system comprises: a user interface for receiving the user defined input; at least one routing table updater for creating and updating routing table that lists the routes to particular destination of the communication link; at least one control module resides in the application layer of protocol stack; and multiple physical interfaces linked with the application layer for receiving and transmission of the data assigned by the said control module.

21 Claims, 2 Drawing Sheets

(56) References Cited

U.S. PATENT DOCUMENTS

| | | | |
|---|---|---|---|
| 7,260,651 | B2 | 8/2007 | Parrella et al. |
| 7,336,605 | B2 | 2/2008 | Bruckman et al. |
| 7,720,098 | B1 | 5/2010 | Allen et al. |
| 7,805,156 | B1 | 9/2010 | Allen et al. |
| 2003/0078964 | A1 | 4/2003 | Parrella et al. |
| 2005/0015511 | A1 | 1/2005 | Izmailov et al. |
| 2008/0052393 | A1* | 2/2008 | McNaughton et al. ....... 709/224 |
| 2010/0011230 | A1 | 1/2010 | Mater et al. |
| 2010/0202310 | A1 | 8/2010 | Lee et al. |

OTHER PUBLICATIONS

Chebrolu, K., et al., "Bandwidth Aggregation for Real-Time Applications in Heterogeneous Wireless Networks;" pp. 1-28.

Taleb, T., et al "A Bandwidth Aggregation-Aware QoS Negotiation Mechanism for Next-Generation Wireless Networks;" IEEEXplore, Nov. 2007 (Abstract only).

International Search Report corresponding to International Patent Application No. PCT/IN2011/000118, Oct. 2011.

Rodriguez, P., et al., "Parallel-Access for Mirror Sites in the Internet;" INFOCOM 2000, Mar. 2000, pp. 864-867.

Baentsch, M., et al., "Introducing application-level replication and naming into today's Web;" Comp. Networks and ISDN Systems, vol. 28, No. 11, May 1996, pp. 921-930.

Conti, M., et al., "Client-side content delivery policies in replicated web services: parallel access versus single server approach;" Performance Evaluation, Feb. 2005 (Abstract only).

Byers, J. W., et al., "Accessing Multiple Mirror Sites in Parallel: Using Tornado Codes to Speed Up Downloads;" Internet Article, INFOCOM /99, Mar. 1999, pp. 275-283.

* cited by examiner

SYSTEM AND METHOD FOR AGGREGATING BANDWIDTH OF MULTIPLE ACTIVE PHYSICAL INTERFACES ON APPLICATION LAYER

FIELD OF THE INVENTION

The present invention relates to the field of telecommunications. Particularly, this invention relates to network communication and purports to achieve bandwidth aggregation of multiple physical communication links of a system based on application layer, thereby enhancing the overall bandwidth of a system.

BACKGROUND OF THE INVENTION

Bandwidth is a resource of communication and is measured as available and consumed data, expressed as bits/sec. It is used as a parameter to determine the condition/capacity of channel/communication link.

Bandwidth is a central concept in many fields, including information theory, radio communications, signal processing, and spectroscopy. The amount of data that can be transmitted in a fixed amount of time, expressed in bits per second (bps) or bytes per second. For example:
  a. V.90 modem supports a maximum theoretical bandwidth of 56 Kbps. Fast Ethernet supports a theoretical maximum bandwidth of 100 Mbps. Same way,
  b. The range of frequencies within which the performance of the antenna, with respect to some characteristics, conforms to a specified standard. (2.4-2.5 GHz antenna has 100 MHz bandwidth).

A communication link has its own bandwidth. Reduction in bandwidth decreases the data rate of the link; this can cause the loss of information. Information loss degrades the quality of the application hence degrades the Quality of Service (QoS). Whereas increase in bandwidth enhances the data rates and improves the quality of service, reduces download and upload data transmission time.

The goal of Quality of Service (QoS) is to provide a guarantee on the ability of a network to deliver predictable results. Elements of network performance within the scope of QoS often include availability (uptime), bandwidth (throughput), latency (delay), and error rate. QoS involves prioritization of network traffic.

Particularly, aggregating the bandwidths of the multiple physical layers associated with different physical interfaces and performing communication with different communication links of wired and wireless network increases overall bandwidth of the system. Some of the prior arts known to us that address the technical problem related bandwidth aggregation are given below:

U.S. Pat. No. 7,805,156 by Allen et al teaches system and method for the dynamic aggregation of communication network bandwidth. The said prior art requires a control network and a network controller to perform bandwidth aggregation. It needs specific network architecture like a combination of control network, payload network, and an egress network for the aggregation.

U.S. Pat. No. 7,336,605 by Bruckman et al teaches a method for establishing a connection with a guaranteed bandwidth for transmitting data over a logical link that includes a plurality of parallel physical links between first and second endpoints. The said prior art requires service level agreement, and the aggregation is based on link layer—using link aggregation group in accordance with IEEE standard 802.3, wherein the link aggregation is performed by a separate system, and requires a central controller system.

U.S. Pat. No. 6,879,590 by Pedersen et al teaches a method, apparatus and system facilitating the aggregation or bonding of physical communication links into higher-bandwidth logical links. The said prior art performs link layer based aggregation. It also uses a link bonding engine which has a counter component both at transmitting and receiving side. It further modifies the data-link frame size and introduces super frame.

U.S. Pat. No. 7,720,098 by Allen et al teaches a method for dynamic bandwidth expansion for wireless clients in a wireless wide-area network (WWAN). The said prior art requires a communication manager to manage traffic between the pool clients, it further needs aggregation server which exposes packet information from each packet containing the data and re-sequences the packets before transmitting the data to the external network, and requires specific network architecture using wireless communication.

U.S. Pat. No. 7,260,651 by Parrella et al teaches a system and method for increasing the effective bandwidth of a communication network provided by overlaying a "super" transport and caching structure over the conventional TCP/IP communications network. The said prior art does not perform bandwidth aggregation using multiple physical interfaces. It describes a method for compressing data by a first computer system for transferring to a second computer system via a communications network, further creating a virtual private network (requiring at least two computer systems, connected over a communication link) and needs a corresponding module at the final end.

United States Patent Application Number 2003078964 by Parrella et al teaches a system and method for reducing the time to deliver information from a communications network to a user. The said prior art does not perform bandwidth aggregation using multiple interfaces. It performs caching of data for use by the application or browser, distributes selected data from a host server across a plurality of caches on a communications network. It uses specific network architecture and establishes a VPN (Virtual private network).

United States Patent Application Number 20050015511 by Izmailov et al teaches a method and apparatus for dynamically discovering and utilizing unused resources for practical and efficient creation of optimized network mechanisms for data distribution. The said prior art requires specific network architecture to perform the bandwidth enhancement. It is based on network layer and application layer, but not completely on application layer.

United States Patent Application Number 2010202310 by Lee et al teaches a bandwidth aggregation system for providing wideband communication services by aggregating multiple bandwidths. The said prior art requires a corresponding module at the destination to perform bandwidth aggregation to compute weights of the multiple bandwidths. It is applicable for base station and mobile system and it is typically used the resource allocation mechanism of a wireless network.

U.S. Pat. No. 6,973,504 by Nomura et al teaches a method and a system enabling reduction in the required resource for the bandwidth reservation in an inter-site connection network used for communication between communication sites. The said prior art requires a specific network system and paths are aggregated with respect to a user site of interest, having an allocated bandwidth smaller than a second user site.

United States Patent Application Number 20100011230 by Mater et al provides configurations and techniques for determining, by link aggregation logic, whether a load of network traffic communicated across a team of aggregated links allows inactivation of one or more aggregated links of the team, wherein the team of aggregated links is coupled with a plurality of network interface cards (NICs). The said prior art performs the load balancing by inactivation of one or more aggregated links of the team; and power off or place into a power save mode one or more of the plurality of NICs corresponding to the one or more aggregated links.

Magalhaes et al in "Transport Level Mechanisms for Bandwidth Aggregation on Mobile Hosts" teaches a solution for channel aggregation at the transport layer, which provides increased bandwidth to mobile nodes. The said prior art requires corresponding module at the destination node and works for mobile environment.

Chebrolu et al in "Bandwidth Aggregation for Real-Time Applications in Heterogeneous Wireless Networks" have disclosed a variety of wireless interfaces that are available for mobile user to access Internet content. The said prior art requires a network layer architecture consisting of an infrastructure proxy for performing the bandwidth aggregation.

Taleb et al in "A Bandwidth Aggregation-Aware QoS Negotiation Mechanism for Next-Generation Wireless Networks" have disclosed a bandwidth aggregation-aware QoS negotiation mechanism that enables users to dynamically negotiate their desired service levels and to reach them through the use of bandwidth aggregation. The said prior art uses bandwidth aggregation based on the service level agreement and packet reordering.

Some of the lacunae that exists in the prior art discussed above are that, firstly they discloses systems and methods which require specific network architecture like a combination of control network, payload network, and an egress network. Secondly most of the prior arts also require a control network and a network controller to perform bandwidth aggregation, and need service level agreement, counter or corresponding module/component and a network proxy to perform bandwidth aggregation. Thirdly some of them perform bandwidth allocation and management but not the bandwidth aggregation. Finally these approaches also do not make use of any application layer for bandwidth aggregation.

Thus there exists a need to address the long standing problem of achieving bandwidth aggregation of multiple active physical interfaces based on application layer without using any specific network architecture, proxy system, service level agreement, or network control system placed between the source and destination, importantly without using any corresponding module or component at the final end.

OBJECTIVES OF THE INVENTION

The principle objective of the present invention is to provide a system and method for aggregation of bandwidth of multiple active physical Interfaces on application layer.

Another objective of the invention is to provide a system and method for enhancing the download and upload data transmission rate with the active physical interfaces using a control module residing in the application layer and increasing the overall bandwidth of the concerned computing system.

Another objective of the invention is to provide a system and method for determining the active physical interface that can join in bandwidth aggregation process at the application layer.

Another objective of the invention is to provide a system and method for providing a bandwidth aggregation system that can reduce the total operational time of data handling by transferring and receiving the data through multiple physical interfaces simultaneously.

Yet another objective of the invention is to provide a system and method which assembles the data transfer and reception path of physical interfaces keeping the physical layer, Medium Access Control (MAC) and other upper layer functional blocks/functionality unchanged.

Still another objective of the invention is to provide an application layer framework that can aggregate the bandwidth of the multiple active physical interfaces.

SUMMARY OF THE INVENTION

Before the system, components and methods are described, it is to be understood that this invention is not limited to the particular systems and methods described, as there can be multiple possible embodiments of the present invention, which are not expressly defined in the present disclosure. It is also to be understood that the terminology used in the description is for the purpose of describing the particular versions or embodiments only, and is not intended to limit the scope of the present invention which will be limited only by the appended claims.

The present invention envisages a system for aggregating the bandwidth of multiple active physical interfaces.

In one aspect of the invention, a method and system is provided for determining the active physical interfaces present in the system and their associated IP (Internet Protocol) addresses.

In another aspect of the invention, a method and system is provided for determining the IP address of the gateway of those interfaces. Interfaces are added in the routing table as new routes as next-hops with equal weights/priorities.

In yet another aspect of the invention, a method and system is provided for maintaining the multiple operating threads in parallel. Numbers of operating threads are identical with the number of interfaces the bandwidth of which is to be aggregated. Operating threads can perform data fetch as well as data transfer activity simultaneously. The said system divides the total data to be handled among the concerned interfaces keeping the ratio of data division identical to the ratio of default data rates of the interfaces.

Further a method and system is provided by way of this invention for increasing the overall data transmission and reception rate and thereby reduces the overall operation time of an application for fetching or transmitting data keeping the functionality of various layers of OSI (Open Systems Interconnection) or TCP/IP stack like physical, medium access, network, transport etc. unchanged.

The bandwidth aggregation system requires multiple active physical interfaces and more than one network connections. In accordance with the present invention, the following pre-requisites are required as user defined inputs in order to realize the system:
  a. the total number of interfaces to be aggregated;
  b. the interface identifier like eth0/eth1, ppp0/ppp1 etc;
  c. the data rates of the interfaces in kbps (killo bits per second)
  d. the 'URL' (uniform resource locator) of the data operation; example—'URL'(uniform resource locator) of video for streaming or URL for a file to download or upload.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific systems and methods disclosed in the drawings.

The present invention will now be described with reference to the accompanying drawing, in which.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The disclosed embodiments are merely exemplary of the invention, which may be embodied in various forms.

The present invention relates to field of telecommunications. Particularly, this invention relates to network communication and purports to achieve bandwidth aggregation of multiple physical communication links of a system based on application layer, thereby enhancing the overall bandwidth of a system.

The system for aggregating the bandwidths of multiple communication links on application layer as per the current invention comprises of:
a) a user interface for receiving the user defined input;
b) at least one routing table updater for creating and updating routing table of multiple active physical interfaces used for bandwidth aggregation; and
c) at least one control module residing in an application layer of protocol stack for performing the data distribution among the multiple active physical interfaces as well as data assembly from the multiple physical interfaces.

Figure 1:
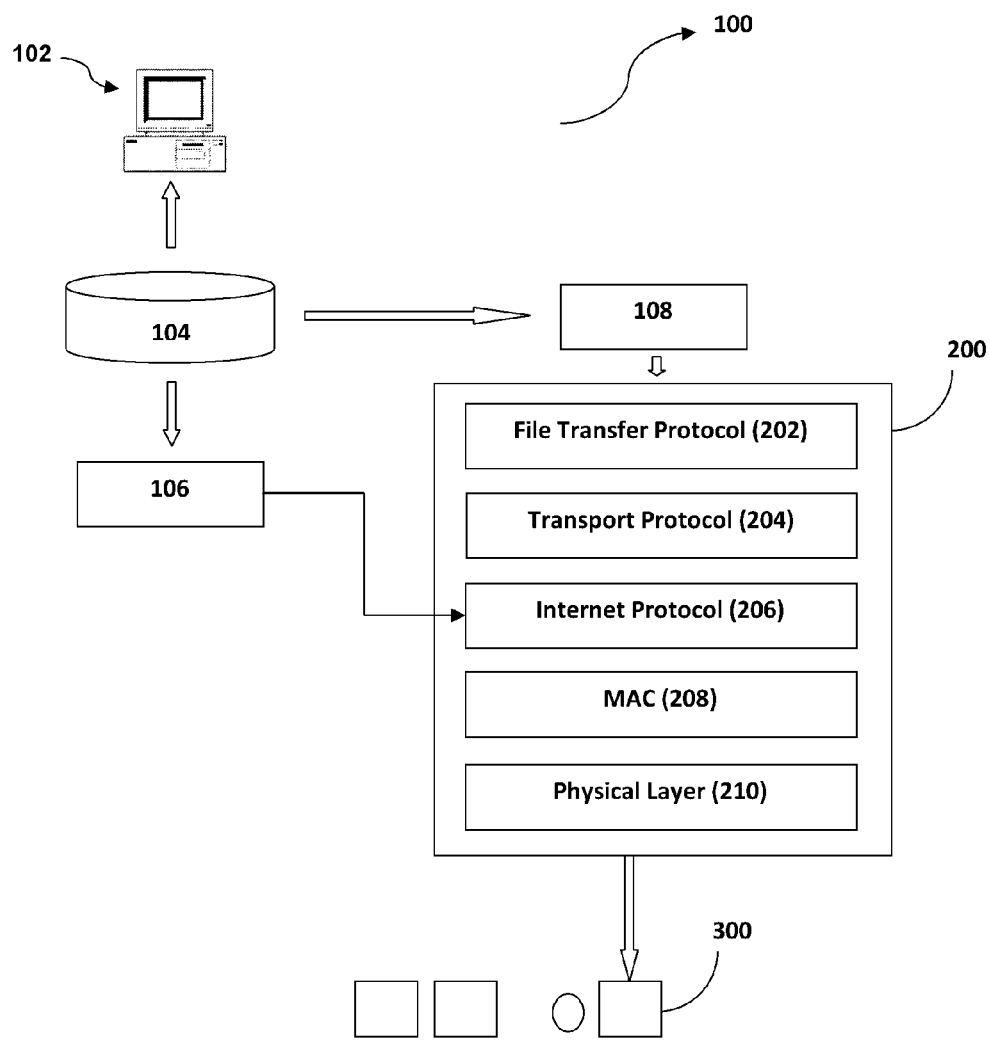
FIG. 1 illustrates the architecture of the system that enables aggregation of the bandwidths of multiple communication links on application layer according to various exemplary embodiments of the invention

FIG. 1 illustrates system architecture 100 based on application layer for aggregating the bandwidths of multiple communication links according to various exemplary embodiments of the invention. The system 100 comprises a user interface 102, a routing table updater 104, a routing table 106, a control module 108, a physical interface 300, and an application layer running on top of the TCP/IP protocol stack 200. The TCP/IP stack 200 further comprises a Hypertext Transfer Protocol (HTTP) 201 (not shown in figure), a File Transfer Protocol (FTP) 202, a Transport protocol 204, an Internet Protocol (IP) 206, a Medium Access Control (MAC) protocol 208, and a Physical layer protocol 210.

According to one exemplary embodiment of the invention the said user interface 102 receives the user defined inputs like interface id, default bandwidth of the interfaces, Uniform Resource Locator (URL)/destination address, mode of operation (upload, download, streaming etc), file name to be used by the said system 100. The said user interface 102 comprises user interface of the computing device such as computer, PDA, Laptop and etc.

In an embodiment of the invention the following pre-requisites are required as user defined inputs in order to realize the system:
a) the total number of interfaces to be aggregated;
b) the interface identifier like eth0/eth1, ppp0/ppp1 etc;
c) the data rates of the interfaces in kbps (killo bits per second)
d) the 'URL' (uniform resource locator) of the data operation;
    example—'URL'(uniform resource locator) of video for streaming or URL for a file to download or upload.

In a further embodiment of the invention the routing table updater (104) determines the active interfaces present in concerned computing system. According to one exemplary embodiment of the invention the routing table updater 104 is used for updating routing table 106 that lists the routes to particular destination of the communication link.

The routing table updater 104 searches with key word 'default' in the routing table 106 to determine the IP address and IP address of the gateway of the default active interface 300 already existing as default route.

The routing table updater 104 also searches with interface identifier i.e., keyword such as eth0, ppp0 in the routing table 106 to determine the IP addresses and IP address of the gateways of those interfaces 300. In this case these active interfaces exist as non default interfaces.

According to one essential embodiment of the invention the routing table updater 104 is a component of bandwidth aggregation system 100.

Further the routing table updater 104 modifies the routing table 106 for the interfaces that are chosen for bandwidth aggregation. It adds these interfaces as default route along with their gateway addresses as next-hops to the existing routing table 106 of the system 100. The routing table updater 106 assigns the equal priority for data transmission and reception to this interface.

The control module 108 resides in the application layer constituting of the TCP/IP protocol stack 200 wherein the TCP/IP protocol stack 200 further comprises the various protocol layers such as Hypertext Transfer Protocol (HTTP) 201 (not shown in figure), File Transfer Protocol (FTP) 202, Transport protocol 204, Internet Protocol (IP) 206, Medium Access Control (MAC) protocol 208, and Physical layer protocol 210 and combinations thereof.

In accordance with one aspect of the invention, depending on the default data rates of the interfaces the control module 108 determines the amount of data to be distributed for either transmission or reception by the interfaces. If the data rate/bandwidth of the n interfaces is $n_1, n_2 \ldots n_n$ the ratio of the data to be handled by the n interfaces is $n_1:n_2 \ldots n_n$. i.e. the control module 108 keeps the ratio of the amount of data to be distributed by the interfaces identical with the ratio of the default data rates of the interfaces.

In another embodiment of the invention the control module 108 creates multiple operational threads 116 same as the number of active physical interfaces, wherein control module 108 remains as the main master thread. The operational threads 116 independently perform data transmission or reception of the data allocated to them by the control module 108, through the different physical interfaces 300. The control module 108 merges the data received by the interfaces in the local system. It also distributes the data transmitted by the active physical interferes 300. The rates of data transmission and reception of the system happen to be the summation of the data rates of the physical interface 300.

In accordance with the present invention, the physical interfaces 300 through which data transmission and reception are occurring are bound by the respective operational threads 116 of the control module 108. The physical interface 300 is bound by their specific IP addresses/interface identifiers. Therefore the data distributions and coupling with the physical interface 300 are happening in the application layer only.

The above proposed system 100 does not require any specific network architecture to perform bandwidth aggregation and also it does not need any network proxy or controller to perform the bandwidth aggregation. Also, the above proposed system 100 does not require any corresponding module/component or counter component (like client server architecture) at the final system/destination node and does not require any service level agreement. The above proposed system 100 runs on application layer thus easy for system integration.

Figure 2:
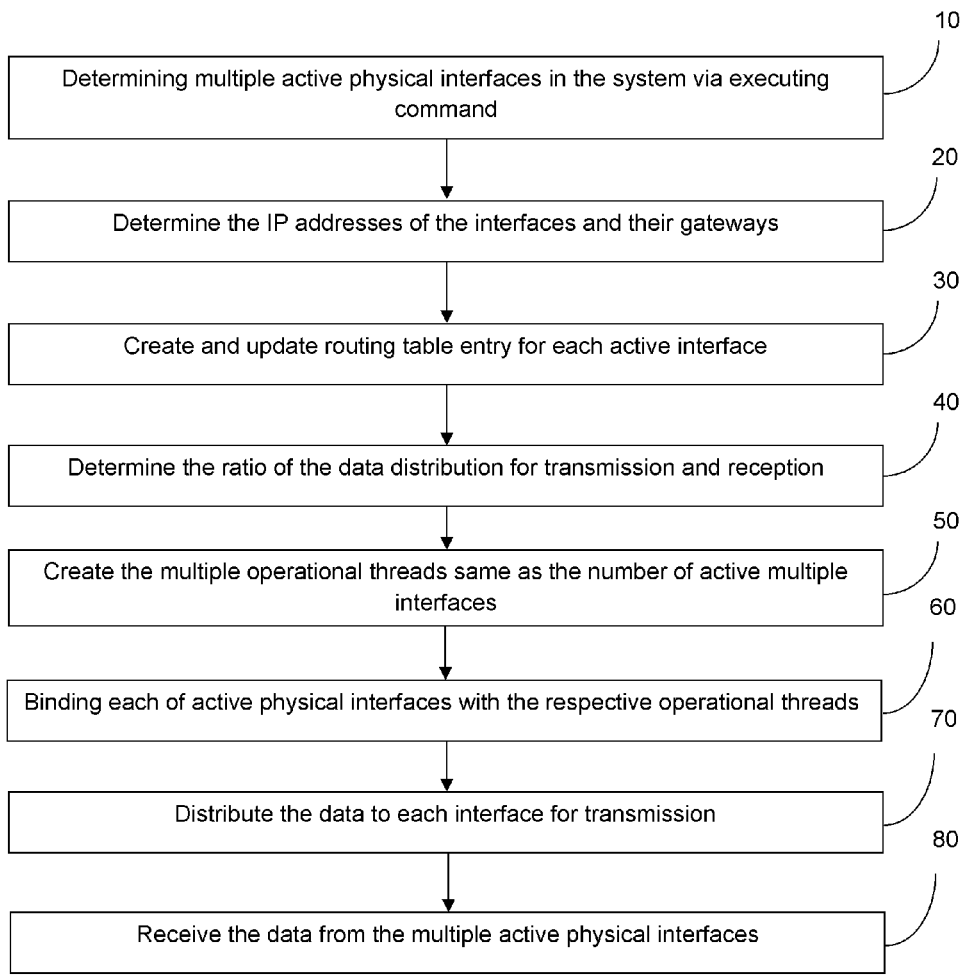
FIG. 2 illustrates a flow diagram of method for aggregating the bandwidths of multiple communication links in a system based on application layer according to various exemplary embodiments of the invention.

FIG. 2 illustrates a flow diagram of method for aggregating the bandwidths of multiple communication links in a system based on application layer according to various exemplary embodiments of the invention. In the initial step 10 of the proposed method, multiple active physical interfaces in the system are determined via executing command by a routing table updater. After determining the multiple active interfaces, in the next step 20, the IP addresses of the interfaces and the IP addresses of their gateways are determined by searching the routing table by using the routing table updater. In the next step 30, routing table is updated by adding multiple active physical interfaces along with their gateways for each active physical interface by using the routing table updater. In the next step 40, the ratio of data distribution is determined for transmission and reception among the active physical interfaces based on the given data rates of the active physical interfaces by a control module. In the next step 50, multiple operational threads are created for each of the active physical interfaces by the control module. In the next step 60, each of the active physical interfaces with the respective operational threads is bound by the control module. In the next step 70, the data is distributed to the each of the active physical interfaces for transmission. In the final step 80 of the proposed method, the data from the multiple active physical interfaces is received simultaneously by the control module.

While considerable emphasis has been placed herein on the particular features of this invention, it will be appreciated that various modifications can be made, and that many changes can be made in the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

ADVANTAGES OF THE INVENTION

The technical advancements of the present invention include:

1) Providing a system which enhances the data rates of a system for its communication to the external network (applicable for both wired and wireless) by n times of the data rates using a single physical interface, where 'n' is the no. of physical interfaces consisting of identical data rates/bandwidth and communicating with similar network;

2) providing a system which can aggregate the data rates/bandwidth of multiple physical interfaces of a computing system, i.e. if there are n interfaces comprising data rates b1, b2 ... bn then the data rates of that computing system becomes b1+b2+ ... bn i.e. $\Sigma bi$ where i=1 to n;

3) providing a system where the data can be transferred or received through multiple physical interfaces simultaneously;

4) providing a bandwidth aggregation system which can reduce the total operational time of data handling by transferring and receiving the data through multiple physical interfaces simultaneously;

5) providing a system which assembles the data transfer and reception path of physical interfaces keeping the physical layer, Medium Access Control (MAC) and other upper layer functional blocks/functionality unchanged, except making addition to routing table of the network layer; and 6) providing a system which interfaces with application layer of the TCP/IP stack only, as well as aggregates the data transmission and reception rates and thus increases the total bandwidth of the computing system under operation.

I claim:

1. A system for dynamically aggregating a plurality of bandwidth of multiple active physical interfaces using an application layer framework, the system comprising:
   a memory; and
   a processor coupled to the memory, the processor executes:
   a) a user interface, adapted for receiving a user defined input to determine IP address and gateway of default and non-default physical interfaces from a routing table;
   b) at least one routing table updater, adapted for creating and updating the routing table of multiple active physical interfaces used for bandwidth aggregation based on the determined IP address and gateway of default and non-default physical interfaces; and
   c) at least one control module residing in the application layer of a protocol stack, adapted to determine multiple active physical interface joining in bandwidth aggregation, and further adapted for performing data distribution, data transmission, data reception and data assembly among the multiple active physical interfaces by utilizing a plurality of web script, wherein the control module creates operational threads for each interface for performing simultaneous transmission or reception of the data allocated to such threads characterized in that number of operational threads are identical with the number of multiple active physical interfaces.

2. The system as claimed in claim 1, wherein the user defined input comprises of total number of interfaces whose bandwidths to be aggregated, their interface id, default bandwidth or data rates of the interfaces, Uniform Resource Locator (URL) or optionally destination of address, mode of operation, file name to be further processed by the physical interfaces.

3. The system as claimed in claim 1, wherein the routing table updater searches with key word 'default' in the routing table to determine the IP address and IP address of the gateway of the default active physical interfaces.

4. The system as claimed in claim 1, wherein the routing table updater searches with keyword with the interface identifier including eth0 and pop0 in the routing table and reckons first IP addresses as gateway IP addresses for non default active physical interfaces in the routing table.

5. The system as claimed in claim 1, wherein the control module determines the ratio of data distribution for transmission and reception among the multiple active physical interfaces and keeping the ratio of data division identical to the ratio of default data rates of the multiple active physical interfaces.

6. The system as claimed in claim 1, wherein the control module merges the data received by the interfaces in the local system, the data transmitted to the remote system by using web scripts, with writing and executing access to remote system.

7. The system as claimed in claim 1, wherein the system enhances the data rates for communication to the external network by n times of the data rates using a single physical interface, wherein the n is the number of physical interfaces consisting of identical data rates or bandwidth and communicating with similar network.

8. The system as claimed in claim 7, wherein the external network comprises of wired or wireless networks, or the combination thereof.

9. The system as claimed in claim 1, wherein the system can aggregate the data rates of multiple physical interfaces of a computing system thereby adding the data rates of the each physical interface.

10. The system as claimed in claim 1, wherein a transport layer protocols is utilized for implementing the system.

11. A method for dynamically aggregating a plurality of bandwidth of multiple active physical interfaces on an application layer framework, the method comprising processor implemented steps of:
  a) determining multiple active physical interfaces via executing command using a routing table updater;
  b) determining IP address of the multiple active physical interfaces and the IP address of the gateways by searching the routing table using the routing table updater;
  c) creating and updating routing table by adding multiple active physical interfaces along with their gateways for each active physical interface by using the routing table updater;
  d) determining ratio of data distribution for transmission and reception of data among the multiple active physical interfaces and keeping the ratio of data division identical to the ratio of default data rates of the multiple active physical interfaces by using a control module;
  e) creating multiple operational threads for each of the multiple active physical interfaces by using the control module;
  f) distributing the data to each of the multiple active physical interfaces for transmission or reception by using the control module;
  g) receiving the data from the multiple active physical interfaces simultaneously by using the control module; and
  h) binding each of multiple active physical interfaces with the respective operational thread to join in bandwidth aggregation by using the control module.

12. The method as claimed in claim 11, further comprising the step of merging the data received by the interfaces in the local system, merging the data transmitted to the same remote system by using web scripts, with writing and executing access to remote system.

13. The method as claimed in claim 11, wherein the method is independent of any specific network architecture to perform bandwidth aggregation.

14. The method as in claim 11, wherein the multiple active physical interface is bound by their specific IP addresses or interface identifiers by the application layer framework, for facilitating data distributions and coupling with the physical interface in the application layer.

15. The method as claimed in claim 11, wherein the method is independent of any network proxy or controller, to perform the bandwidth aggregation.

16. The method as claimed in claim 11 wherein the method is independent of any corresponding module, component or counter component like client server architecture at the final system or destination node.

17. The method as claimed in claim 11, wherein the method is independent of any service level agreement.

18. The method as claimed in claim 11, wherein the method runs on application layer.

19. The method as claimed in claim 11, wherein the method enhances the data rates for communication to the external network by n times of the data rates using a single physical interface, wherein the n is the number of physical interfaces consisting of identical data rates or bandwidth and communicating with similar network.

20. The method as claimed in claim 11, wherein the external network comprises of wired or wireless networks, or the combination thereof.

21. A non-transitory computer program product for dynamically aggregating a plurality of bandwidth of multiple active physical interfaces on an application layer framework, the computer program product comprising at least one computer-readable storage medium having a computer executable program code instruction stored therein, the computer executable program code instruction comprising:
  a) program code instruction for determining multiple active physical interfaces via executing command using a routing table updater;
  b) program code instruction for determining IP address of the multiple active physical interfaces and the IP address of the gateways by searching the routing table using the routing table updater;
  c) program code instruction for creating and updating routing table by adding multiple active physical interfaces along with their gateways for each active physical interface by using the routing table updater;
  d) program code instruction for determining ratio of data distribution for transmission and reception of data among the multiple active physical interfaces and keeping the ratio of data division identical to the ratio of default data rates of the multiple active physical interfaces by using a control module;
  e) program code instruction for creating multiple operational threads for each of the multiple active physical interfaces by using the control module;
  f) program code instruction for distributing the data to each of the multiple active physical interfaces for transmission or reception by using the control module;
  g) program code instruction for receiving the data from the multiple active physical interfaces simultaneously by using the control module; and
  h) program code instruction for binding each of multiple active physical interfaces with the respective operational thread to join in bandwidth aggregation process by using the control module.

* * * * *